(12) United States Patent
Gossain et al.

(10) Patent No.: US 11,042,352 B2
(45) Date of Patent: *Jun. 22, 2021

(54) GROUP COORDINATOR SELECTION

(71) Applicant: Sonos, Inc., Santa Barbara, CA (US)

(72) Inventors: Hrishikesh Gossain, Santa Barbara, CA (US); Gary Fox, Santa Barbara, CA (US); Jeff Derderian, Ashburn, VA (US); Jeffrey Peters, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,992

(22) Filed: Oct. 14, 2019

(65) Prior Publication Data
US 2020/0142666 A1   May 7, 2020

Related U.S. Application Data

(63) Continuation of application No. 16/173,820, filed on Oct. 29, 2018, now Pat. No. 10,445,058, which is a continuation of application No. 14/984,974, filed on Dec. 30, 2015, now Pat. No. 10,114,605.

(51) Int. Cl.
*G06F 3/16* (2006.01)
*H04L 29/06* (2006.01)

(52) U.S. Cl.
CPC ............ *G06F 3/165* (2013.01); *H04L 65/602* (2013.01)

(58) Field of Classification Search
USPC .......................................................... 700/94
See application file for complete search history.

(56) References Cited

U.S. PATENT DOCUMENTS

| | | | |
|---|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |

(Continued)

FOREIGN PATENT DOCUMENTS

| | | |
|---|---|---|
| EP | 1389853 A1 | 2/2004 |
| WO | 2003093950 A2 | 11/2003 |

OTHER PUBLICATIONS

Advisory Action dated Jun. 15, 2018, issued in connection with U.S. Appl. No. 14/984,974, filed Dec. 30, 2015, 2 pages.

(Continued)

*Primary Examiner* — Amal S Zenati

(57) ABSTRACT

A first playback device may include at least one battery, a network interface, at least one processor, a non-transitory computer-readable medium, and program instructions stored on the non-transitory computer-readable medium. The program instructions may be executable by the at least one processor such that the first playback device is configured to (i) receive an instruction to operate as a group coordinator of a synchrony group, (ii) determine a value of a battery state variable of the at least one battery, (iii) based on the value of the battery state variable of the at least one battery, select a second playback device from one or more other members of the synchrony group to operate as the group coordinator of the synchrony group, and (iv) cause the second playback device to operate as the group coordinator of the synchrony group.

19 Claims, 12 Drawing Sheets

(56) References Cited

U.S. PATENT DOCUMENTS

| | | | |
|---|---|---|---|
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 9,654,545 | B2 | 5/2017 | Gossain et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2005/0059420 | A1* | 3/2005 | Salokannel ............ H04L 45/00 455/522 |
| 2007/0142944 | A1 | 6/2007 | Goldberg et al. |
| 2007/0258508 | A1* | 11/2007 | Werb .................... H04L 9/083 375/140 |
| 2008/0133715 | A1 | 6/2008 | Yoneda et al. |
| 2009/0171487 | A1* | 7/2009 | Wilhelm ............... G11B 27/10 700/94 |
| 2014/0269402 | A1* | 9/2014 | Vasseur .............. H04L 41/0659 370/253 |
| 2014/0269412 | A1 | 9/2014 | Venaas et al. |
| 2019/0037272 | A1* | 1/2019 | Gossain ............... H04R 29/007 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Extended Search Report dated Apr. 24, 2017, issued in connection with European Application No. 16002648.0, 9 pages.
Final Office Action dated Feb. 9, 2018, issued in connection with U.S. Appl. No. 14/984,974, filed Dec. 20, 2015, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 6, 2017, issued in connection with U.S. Appl. No. 14/984,974, filed Dec. 30, 2015, 7 pages.
Non-Final Office Action dated Feb. 7, 2019, issued in connection with U.S. Appl. No. 16/173,820, filed Oct. 29, 2018, 8 pages.
Notice of Allowance dated Aug. 8, 2018, issued in connection with U.S. Appl. No. 14/984,974, filed Dec. 30, 2015, 6 pages.
Palm, Inc., "Handbook for the Palm VII Handheld," May 2000, 311 pages.
U.S. Appl. No. 60/490,768, filed Jul. 28, 2003, entitled "Method for synchronizing audio playback between multiple networked devices," 13 pages.
U.S Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

GROUP COORDINATOR SELECTION

CROSS REFERENCE TO RELATED APPLICATIONS

This application claims priority under 35 U.S.C. § 120 to, and is a continuation of, U.S. patent application Ser. No. 16/173,820 filed Oct. 29, 2018 and entitled "Group Coordinator Selection," which is incorporated herein by reference in its entirety. U.S. patent application Ser. No. 16/173,820 is a continuation of U.S. patent application Ser. No. 14/984,974 filed Dec. 30, 2015 and entitled "Group Coordinator Selection," which is also incorporated by reference in its entirety for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play audio in any room that has a networked playback device. Additionally, using the control device, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
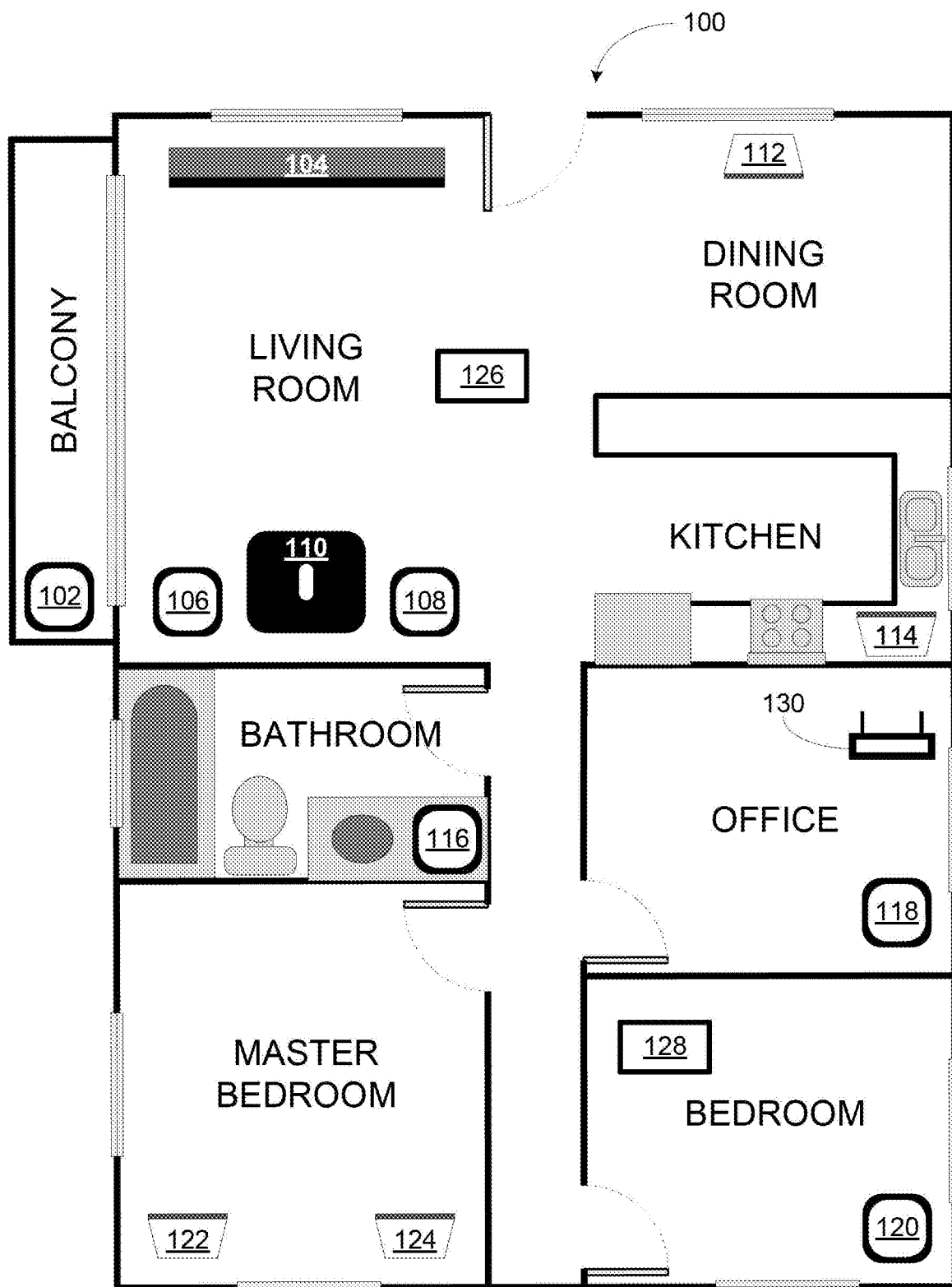
FIG. 1 shows an example playback system configuration in which certain embodiments may be practiced.

The drawings are for the purpose of illustrating example embodiments, but it is understood that the embodiments are not limited to the arrangements and instrumentality shown in the drawings.

DETAILED DESCRIPTION

I. Overview

Embodiments described herein involve identifying a group coordinator device for a group of audio playback devices in a networked media playback system where at least one of the audio playback devices is a battery-powered audio playback device.

A media playback system may include a plurality of audio playback devices (also referred to herein as playback devices) grouped together to render audio content in synchrony. Each of the plurality of audio playback devices may be configured to communicate with one another via a communication network. In one example, a particular audio playback device of the plurality of audio playback devices may be configured to receive the audio content from a local media content source or a remote media content source. The particular audio playback device may be arranged to distribute via the communication network the received audio content to the plurality of audio playback devices that are grouped together. The particular audio playback device may also be configured to coordinate synchronous playback by the plurality of audio playback devices by providing playback timing information to each of the plurality of audio playback devices that are grouped together. For discussions herein, the particular audio playback device may be referred to as a group coordinator for the group of audio playback devices.

Embodiments described herein may involve selecting a particular audio playback device of a plurality of audio playback devices in the media playback system to be the group coordinator when at least one of the audio playback devices in the media playback system is a battery-powered device. Selection of the particular audio playback device may be based on one or more configurations of the battery-powered audio playback devices in the media playback system, configurations of the media playback system in view of the battery-powered audio playback device, and quantitative evaluations and analyses.

The audio playback device may be a battery-powered device (or generally battery-powered) when it obtains power from an internal battery. Additionally, the audio playback device may be a battery-powered device when it receives power from an external power source in addition to or instead the internal battery. The audio playback device may receive this external power during a charging process where the audio playback device may be connected to the external power source at a charging interface. The charging interface may receive power from an electrical outlet, an external battery, or an electromagnetic source (e.g., the charging interface is configured for inductive charging) to facilitate charging of the internal battery. The charging interface could also be configured as a base on which the audio playback device may be placed to charge the internal battery.

The battery-powered playback device may store one or more state variables associated with operation of the playback device. The state variables may include one or more of an indication of whether the playback device is connected to the charging interface and being charged, the battery level of the playback device, whether the battery level is above or below a threshold, an amount of time the playback device will be operated (e.g., duration of audio content to be played back), and a volume setting of the playback device. The playback device may send one or more of these state variables to other network devices via the communication network either periodically or in response to a request. The network devices may include control devices, playback devices, or bridge devices among other devices in the media playback system network.

The group coordinator may be determined by a control device in some instances. A control device controls the media playback system. The control device may be responsible for facilitating playback of the media content, and in this regard, may identify a group coordinator for the group. The control device may make this determination based on the configuration and arrangement of the playback devices in the media playback system.

In other instances, a playback device may additionally or alternatively determine the group coordinator for the group of audio playback devices. For example, the control device may identify the playback device as a group coordinator and the playback device, itself, may determine whether to be the group coordinator or identify another playback device in the media playback system to be the group coordinator.

In still other instances, the group coordinator may be initially determined by default based on the media playback system configuration. For instance, in a stereo pair, a left speaker may be a group coordinator for the left and right speaker. In another instance, a center speaker of a 5.1 Dolby Surround System may be the group coordinator for the surround system. In yet another instance, the group coordinator may be the playback device that receives a command to play audio content. In another instance, a group coordinator may be the playback device to which another playback device is added. For example, if a playback device in a living room is playing audio content and is grouped with a playback device in a kitchen, then the playback device in the living room is the group coordinator for the playback device in the kitchen. Other arrangements are also possible.

In some embodiments, a playback device which is battery-powered is not a group coordinator device. The control device may receive an indication, e.g., command, to play back media content by a group of media playback devices. This indication may come from a user interface on the control device itself. Alternatively, the indication may come from another playback device in the media playback system. The control device may determine which playback device in the group should be the group coordinator for the group of audio playback devices. For instance, the control device may determine the configuration of each of the playback devices. Using the state variable for a particular playback device, the control device may determine that a particular playback device in the group is a battery-powered device. In this case, the control device will not select the particular playback device and instead identify another playback device in the group to be the group coordinator.

The other playback device that is identified may be a designated playback device for the battery-powered playback device. Alternatively, the other playback device that is selected may be based on one or more criteria. The criteria may include a processing load of the other playback device. The criteria may include a proximity of the other playback device to a root of the media playback system network. Additionally, the criteria may include a proximity to a charging interface of a battery-powered playback device or a proximity to a battery-powered playback device. The battery-powered playback device may be the particular playback device which was determined to be battery-powered or some other battery-powered playback device. The proximity may generally be determined based on a network map known to the control device or specifically through a calculation of network hops to a particular location based on this network map.

The proximity may also be determined based on a received signal strength (RSSI) measure or packet error rate (PER) measure. The control device may send a message to a playback device to provide the desired RSSI or PER measure to the control device and the playback device may respond with the measure. The control device may analyze the measures received from each of the playback devices and select a playback device based on the PER or RSSI. For example, a playback device with a lower PER or higher RSSI may be the group coordinator.

Alternatively, a control device may identify a battery-powered playback device to be a group coordinator, but the battery-powered playback device may then identify another playback device to be the group coordinator instead of itself. The battery-powered playback device may make this identification similar to how the control device would make this identification. In one case, the playback device may inform the control device that the other playback device is the group coordinator. In another case, the battery-powered playback device might not inform the control device and simply relay any messages (e.g., commands relating to management of the media playback system) between the control device and the playback device serving as the group coordinator. In yet another case, the playback device designated as the group coordinator may inform the control device that it is the group coordinator.

The group coordinator that is selected might or might not be part of the group. As one example, if the group includes one or more non-battery-powered playback devices, then the group coordinator may be one of these playback devices and also be in the same group. In the event that all of the playback devices in the group are battery-powered, then the control device or playback device may identify a non-battery-powered playback device not in the group to be the group coordinator. The non-battery-powered playback device selected as the group coordinator may not be in the same group as the battery-powered playback devices and may not play back audio content in synchrony with the group it coordinates. But the group coordinator could still be playing back audio content associated with another group that it does not coordinate.

If the media playback system contains only one playback device and the one playback device is battery-powered, then the control device may designate the battery-powered playback device as the group coordinator. However, if another playback device is added to media playback system and the other playback device is not powered by a battery, then the other playback device may be identified as the group coordinator.

In still other instances, a battery-powered playback device may be configured as a group coordinator. If all of the playback devices in the media playback system are battery-powered playback devices, then one of the battery-powered playback may be the group coordinator. The control device or the playback device itself may identify the battery-powered playback device to be the group coordinator based on one or more criteria. The criteria may include whether the battery-powered playback device is connected to a charging interface for charging and a battery level of the battery for the battery-powered playback device. These criteria may be defined by the state variables.

The criteria may also include a remaining operational time of the playback device. The battery-powered playback device may be playing audio for a period of time. If this period of time is less than a threshold amount, then the battery-powered playback device may be identified as a group coordinator. Otherwise, the battery-powered playback device may not be identified as the group coordinator. The threshold amount may vary based on operational parameters of the playback device including volume of the playback device. Additionally, the criteria may include a proximity to a root of the media playback system network and a processing load of a playback device.

In yet other instances, the battery-powered playback device may be identified over a playback device not powered by a battery. One or more criteria may be evaluated in making this identification. The criteria may include the battery-powered playback device being connected to the charging interface and being charged. The criteria may also include a battery power of the battery being above a threshold amount and a processing load of a particular playback device.

Other criteria are also possible. For example, if the RSSI measure for the battery-powered playback device to the root of the media playback system network is above a threshold, then the battery-powered playback device may be identified as a group coordinator. If the RSSI measure for the battery-powered playback device to the root is greater than the RSSI measure for the playback device not powered by the battery to the root, then the battery-powered playback device may be identified as a group coordinator.

Moving on from the above overview, an example embodiment includes a network device comprising a network interface configured to communicate with first playback device and a second playback device over a network; a processor comprising instructions, which when executed, cause the processor receive a command to cause a group of one or more playback devices to play audio content, wherein the group of one or more playback devices comprises the first playback device; in response to the command, determine that the first playback device is battery-powered; and identify the second playback device to provide audio content data and audio content playback timing information to the group of the one or more playback devices based on the determination that the first playback device is battery-powered. The second playback device may not be battery-powered. The second playback device may not be in the group of the one or more playback devices. The instructions may further comprise sending a message to the second playback device relating to the identification of the second playback device. The instructions for identifying the second playback device may comprise determining one or more of (i) a proximity of the second playback to a root to a media playback system; (ii) a proximity of the second playback device to the first playback device; and (iii) a proximity of the second playback device to a charging interface of the first playback device. The proximity may be based on one or more of network hops for communication between the first playback device and the second playback device and an RSSI between the first playback device and the second playback device. The instructions for identifying the second playback device may comprise determining an RSSI measurement to a root of a media playback system network. The instructions for identifying the second playback device may comprise determining that an RSSI measurement from the first playback device to a root of a media playback system network is less than an RSSI measurement from the second playback device to the root.

In another example embodiment, a method may comprise receiving a command to cause a group of one or more playback devices to play audio content, wherein the group of one or more playback devices comprises the first playback device; in response to the command, determining that a first playback device is battery-powered; and identifying a second playback device to provide audio content data and audio content playback timing information to the group of the one or more playback devices based on the determination that the first playback device is battery-powered. The second playback device may not be battery-powered. The second playback device may not be in the group of the one or more playback devices. The first playback device may be an access point of a media playback system. The method of identifying the second playback device may comprise determining one or more of (i) a proximity of the second playback to a root to a media playback system; (ii) a proximity of the second playback device to the first playback device; and (iii) a proximity of the second playback device to a charging interface of the first playback device. The proximity may be based on one or more of network hops for communication between the first playback device and the second playback device and an RSSI between the first playback device and the second playback device. The method of identifying the second playback device may comprise determining an RSSI measurement to a root of a media playback system network. The method of identifying the second playback device may comprise determining that an RSSI measurement from the first playback device to a root of a media playback system network is less than an RSSI measurement from the second playback device to the root.

In yet another example embodiment, a computer readable storage medium may include instructions for execution by a processor, which cause the processor to implement a method comprising receiving a command to cause a group of one or more playback devices to to play audio content, wherein the group of one or more playback devices comprises the first playback device; in response to the command, determining that a first playback device is battery-powered; and identifying a second playback device to provide audio content data and audio content playback timing information to the group of the one or more playback devices based on the determination that the first playback device is battery-powered. The method of identifying the second playback device may comprises determining one or more of (i) a proximity of the second playback to a root to a media playback system; (ii) a proximity of the second playback device to the first playback device; and (iii) a proximity of the second playback device to a charging interface the first playback device. The proximity may be based on one or more of network hops for communication between the first playback device and the second playback device and an RSSI between the first playback device and the second playback device. The method of identifying the second playback device may comprise determining an RSSI measurement to a root of a media playback system network.

In an embodiment, a method comprises receiving, by the playback device, a command to play audio content; determining that the playback device is to be a group coordinator for a group of at least one or more playback devices in the media playback system, wherein the playback device is not in the group of the one or more playback device; and based on the determination, providing, by the playback device, audio content data and audio content playback timing information to the group of the one or more playback devices.

In another embodiment, a method comprises receiving, by a battery-powered playback device, a command to play audio content; determining that the battery-powered playback device is to be a group coordinator for a group of one or more playback devices based on the command, wherein the group includes one or more playback devices not configured to be powered by a battery; and based on the determination, providing, by the battery-powered playback device, audio content data and audio content playback timing information to the group of the one or more playback devices.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control device 126, 128, and a wired or wireless network bridge 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
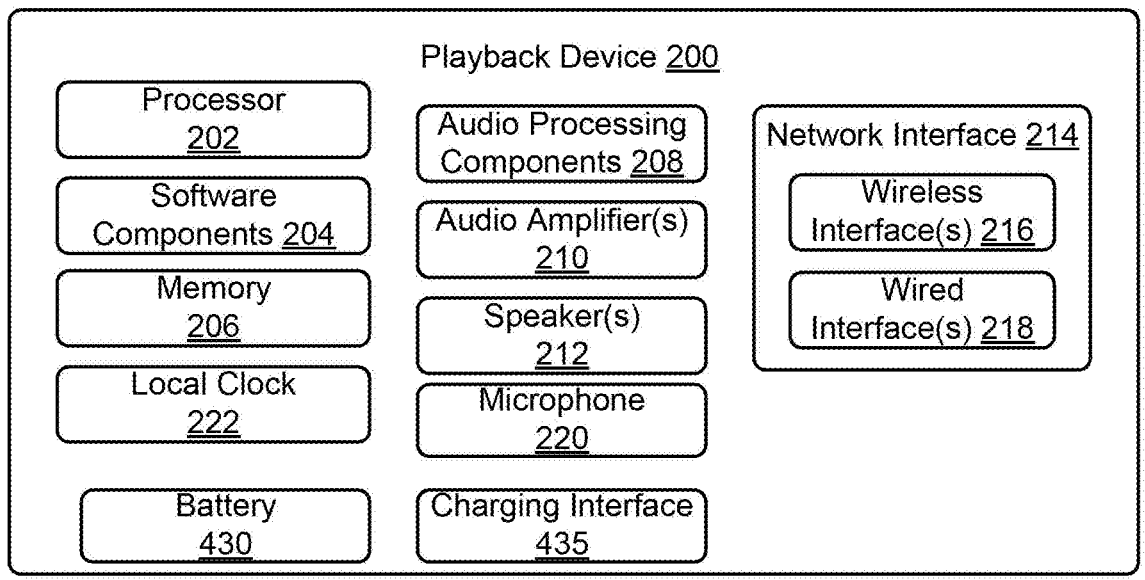
FIG. 2 shows a functional block diagram of an example playback device.

FIG. 2 shows a functional internal block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, battery 430, power interface 435, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a computing component configured to process input data according to instructions stored in the memory 206. The processor 202 may be driven in some examples by a local clock 222 which may be a hardware circuit such as a timer, oscillator, voltage controlled oscillator, crystal, or counter which maintains timing on the example playback device 200. In other arrangements the local clock 222 may be a combination of hardware and software. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

In some embodiments, the playback device 200 may have at least one battery 430 and/or a charging interface 435 that provide power to the playback device 200. The at least one battery 430 may be a rechargeable battery (e.g., a lithium-ion battery, a lithium-ion polymer battery, a lead-acid battery, a nickel cadmium battery, or a nickel metal hydride battery, among other examples) or a disposable battery. The charging interface 435 may receive power from an electrical outlet, an external battery, or an electromagnetic source (e.g., the charging interface 435 is configured for inductive charging) to facilitate charging of the at least one battery 430. The charging interface 435 may be configured as a base on which the audio playback device may be placed to charge the at least one battery 430.

The playback device 200 may be a "battery-powered device" (or generally "battery-powered") when it obtains power from the at least one battery 430. Additionally, the playback device 200 may be a battery-powered device when it receives power via the charging interface 435 in addition to receiving power from the at least one battery 430.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. The speaker(s) 212 may also be capable of beam-steering, e.g., playing audio sound in such a way as to aim the audio sound at a particular angle within a window of the playback device. In some instances, independently addressable drivers of the speakers(s) 212 enable beam-steering through physically altering the direction of one or more drivers or offsetting phase for each a given set of audio drivers to aim the sound. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection), or the network interface 214. The playback device may be equipped with a microphone 220 or microphone array 220. The microphone(s) 220 may be an acoustic-to-electric transducer or sensor that converts sound into an electrical signal. The microphone(s) 220 may be used to detect the general location of an audio source. The electrical signal of the microphone(s) 220 may need to be amplified before being further processed. Accordingly, an amplifier such as audio amplifier 210 may also receive the electrical signal from the microphone 220 and amplify it for further processing by the audio processing components 208. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other network devices (or generally devices e.g., other playback device(s), speaker(s), receiver(s), bridge devices (s), control device(s) within a data network the playback device 200 is associated with) in accordance with a communication protocol (e.g., any wireless standard including Bluetooth, WiFi, IEEE 802.11a, 802.11b, 802.11g, 802.11n, 802.11ac, 802.15, 4G mobile communication standard, near field communication (NFC) and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
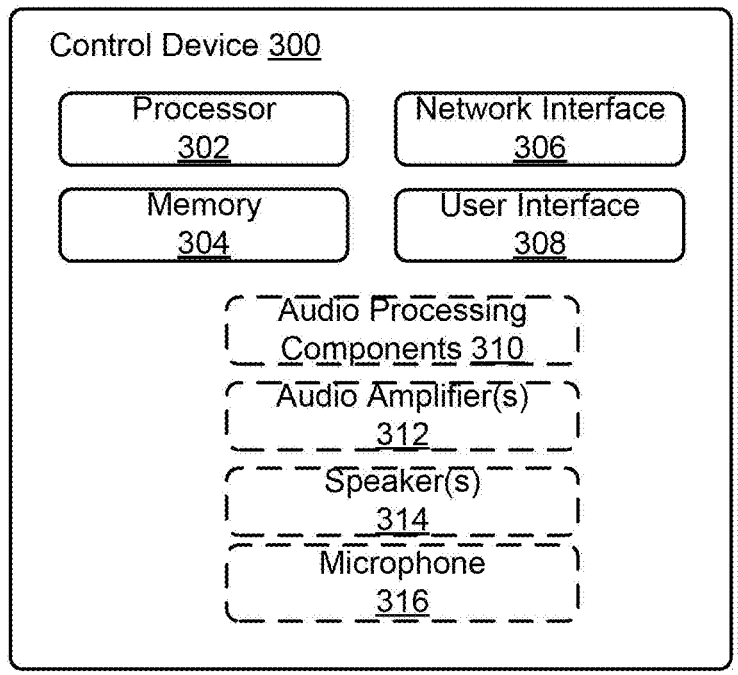
FIG. 3 shows a functional block diagram of an example control device.

FIG. 3 shows a functional block diagram of an example control device 300 that may be configured to be the control device 126 of the media playback system 100. As shown, the control device 300 may include a processor 302, memory 304, a network interface 306, and a user interface 308. In one example, the control device 300 may be a dedicated control device for the media playback system 100. In another example, the control device 300 may be a network device on which media playback system control device application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system control device application software and other data associated with the media playback system 100 and the user.

In one example, the network interface 306 may be based on an industry standard (e.g., infrared, radio, wired standards including IEEE 802.3, wireless standards including Bluetooth, WiFi, IEEE 802.11a, 802.11b, 802.11g, 802.11n, 802.11ac, 802.15, 4G mobile communication standard, near field communications (NFC) and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a control device, whether the control device 300 is a dedicated control device or a network device on which media playback system control device application software is installed.

In some embodiments, the control device 300 may also be equipped with capability to play back audio sound. Accordingly, the control device 300 may have optionally have audio processing components 310, audio amplifier 312, speaker 314 and microphone(s) 316 shown in FIG. 3 as dotted line boxes.

Figure 4:
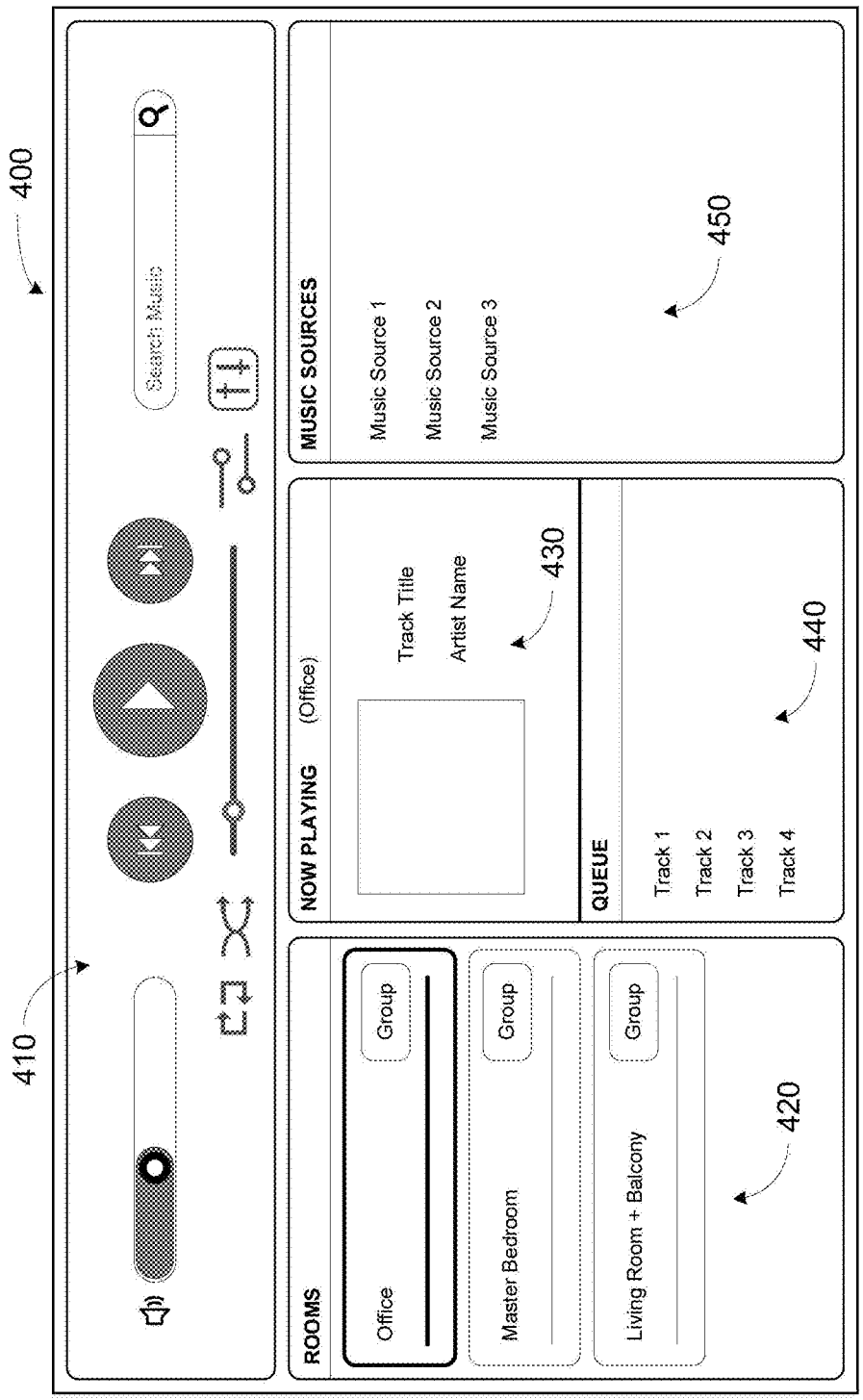
FIG. 4 shows an example control device interface.

The user interface 308 of the control device 300 may be configured to facilitate user access and control of the media playback system 100, by providing a control device interface such as the control device interface 400 shown in FIG. 4. The control device interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Systems for Identifying a Group Coordinator

Embodiments described herein involve identifying a group coordinator device for a group of audio playback devices in a networked media playback system where at least one of the media playback devices is a battery-powered audio playback device.

Figure 5A:
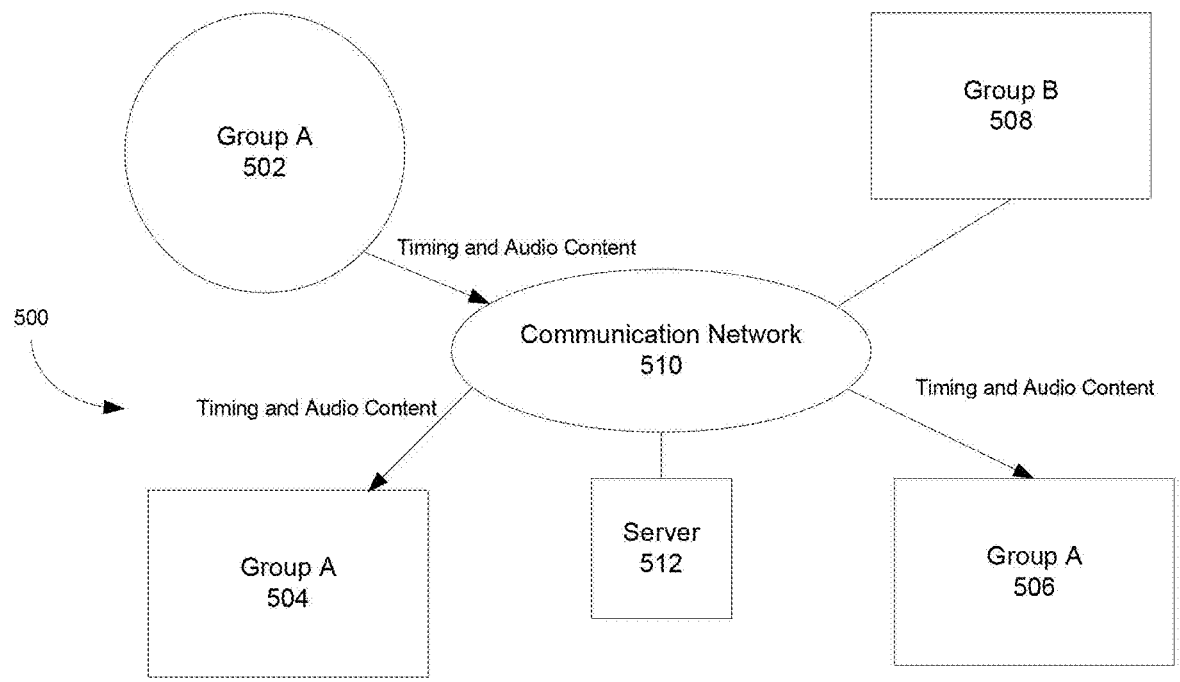
FIG. 5A shows an example network configuration for grouping playback devices.

FIG. 5A illustrates an example grouping configuration of a networked media playback system 500. The networked media playback system may include a plurality of audio playback devices 502, 504, 506, 508 and a server 512 configured to communicate with one another via a communication network 510.

The communication network 510 may be, for example, a WiFi network, Bluetooth network, cellular network, satellite network, or the Internet. The communication network 510 may transmit and receive data between the audio playback devices.

The server 512 may be a computer system or data storage system configured to store and transmit media content such as audio content, video content, or a combination of audio and video content to the playback devices via the communication network 510. The server 512 may be a local media content source or a remote media content source to the playback media system 500 accessible via the Internet in some examples.

In embodiments, if one of the playback devices is coupled directly to the server 512 via a direct line to the server 512 or direct line to a router/modem device in communication with the server 512, then the playback device may also operate as a bridge device in the media playback device and/or root device of a spanning tree protocol (STP). In other embodiments, the bridge device may be a device that simply receives and transmits audio content, e.g., to one or more playback devices (e.g., acts as a relay), and may not play audio content.

The playback devices may be grouped together to render media content in synchrony. For example, the grouped playback devices may be playback devices corresponding to a same zone playing the same content in a same location, such as a kitchen. The example network media playback system of FIG. 5A illustrates playback devices associated with two groups, Group A and Group B. The playback devices 502, 504, and 506 are associated with Group A. The playback device 508 is associated with Group B. The playback devices in Group A may playback audio content in synchrony and/or be a same zone, the playback devices in Group B may play back audio content in synchrony and/or be in a same zone, but playback device 508 in Group B may not play back audio content in synchrony with the playback devices in Group A and/or may not be in a same zone.

A particular device of the plurality of audio playback devices may be configured to provide audio content to the plurality of audio playback devices. The particular device may also be configured to coordinate synchronous playback by the plurality of audio playback devices by providing playback timing information to each of the plurality of audio playback devices. For discussions herein, the particular device may be referred to as the group coordinator for the group of audio playback devices. In the example configuration, playback device 502 may be the group coordinator. Playback device 502 sends timing and audio content to playback devices 504, 506. In the networked media playbacks system of FIG. 5A, the group coordinator may also be part of the group rendering audio content in synchrony. As a result, the group coordinator 502 in conjunction with playback devices 504, 506 may render audio content in synchrony. Playback device 508 might not render content in synchrony with the content associated with playback devices 502, 504, 506 but could render content in synchrony with other playback devices.

Figure 5B:
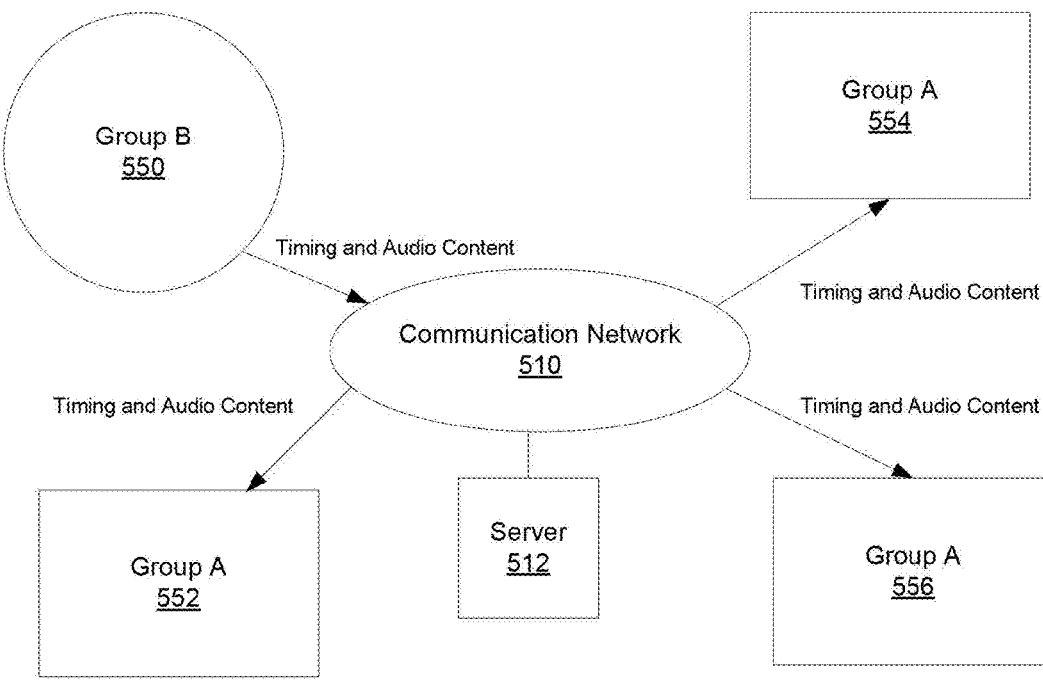
FIG. 5B shows an example network configuration for grouping playback devices.

FIG. 5B illustrates another example grouping configuration of a networked media playback system. The networked media playback system of FIG. 5B shows playback devices 550, 552, 554, 556 configured to communicate over communication network 510. Playback device 550 is shown to be part of Group B and playback devices 552, 554, and 556 are shown to be part of Group A. Playback device 550 sends timing and audio content to playback devices 552, 554, and 556. As a result, playback device 550 is illustrated as a group coordinator, and playback devices 552, 554, 556 play back audio content in synchrony. However, as illustrated, and unlike FIG. 5A, playback device 550 is not in the same group as playback devices 552, 554, and 556. For example, playback device 550 may be in a different zone than playback devices 552, 554, 556, for example. As a result, playback devices 552, 554, and 556 may playback audio content in synchrony but the audio content may not be in synchrony with playback device 550 even though playback device 550 is a group coordinator.

FIG. 5 describes that the group coordinator is a playback device. However, in some embodiments, the group coordinator may be arranged as a bridge device which may not be arranged to play back audio content. In this regard, the bridge device may relay audio content e.g., among playback devices, but might not be arranged to play back audio content itself.

The playback device in example embodiments may store one or more state variables in its memory 206 associated with operation of the playback device. One state variable may be an indicator of whether the playback device is "battery-powered device." The playback device 200 may be a "battery-powered device" (or generally battery-powered) when it obtains power from the at least one battery 430. Additionally, the playback device 200 may be a battery-powered device when it receives power via the charging interface 435 in addition to receiving power from at least one battery 430.

A battery-powered device may store additional state variables associated with how long the battery-powered playback device can play back audio content. As one example, the state variables may include an indication of whether the playback device is connected to the charging interface 435 and being charged. As another example, the state variable may include an indication of the battery level of the playback device. The indication may be a voltage level or whether the battery level is above or below a threshold. As yet another example, the state variable may indicate an amount of time the playback device will be operated (e.g., duration of audio content to be played back). As another example, the playback device may indicate a volume level of the playback device. The higher the volume of the playback device, the less time the playback device may be able to play back audio under battery power.

Embodiments of the present application may involve identifying a particular audio playback device in a media playback system as the group coordinator device for playback devices when at least one of the audio playback devices in the media playback system is a battery-powered device.

The group coordinator may be determined by a control device in some instances. A control device controls the media playback system. The control device may be responsible for facilitating playback of the audio content, and in this regard, may identify a group coordinator for the group. The control device may base this determination on the configuration and arrangement of the playback devices in the media playback system.

In other instances, a playback device may additionally or alternatively determine whether it should be a group coordinator for the group of audio playback devices. The audio playback device may be a battery-powered playback device or a non battery-powered playback device. The control device may identify a battery-powered audio playback device to be group coordinator and the battery-powered audio playback device, itself, may determine whether to be the group coordinator or identify another audio playback device in the media playback system to be the group coordinator. The audio playback device may base this determination on its configuration and the arrangement of the media playback devices in the media playback system.

In still other instances, the group coordinator may be determined initially by default based on the media playback system configuration. For instance, in a stereo pair, a left speaker may be a group coordinator for the left and right speaker. In another instance, a center speaker of a 5.1 Dolby surround system may be the group coordinator for the surround system. In yet another instance, the group coordinator may be the playback device that receives a command to play audio content. In another instance, a group coordinator may be the playback device to which another playback is added. For example, if a playback device in a living room is playing audio content and is grouped with a playback device in a kitchen, then the playback device in the living room is the group coordinator for the playback device in the kitchen. Other arrangements are also possible.

Methods shown in FIGS. 6-13 present embodiments that can be implemented within the disclosed operating environment by a control device, battery-powered playback device, or non-battery-powered playback device. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

Figure 6:
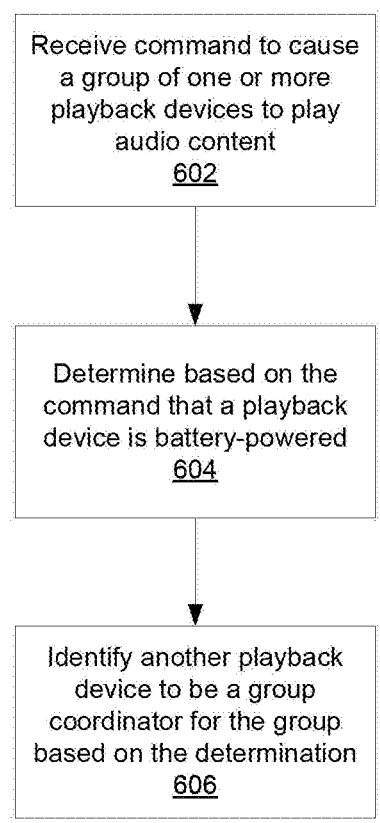
FIG. 6 is an example flow diagram for identifying a group coordinator.

FIG. 6 illustrates one embodiment for identifying a playback device to be a group coordinator when a media playback system includes at least one battery-powered playback device and non-battery-powered playback device. At block 602, a control device or battery-powered playback device may receive an indication, e.g., a command, to cause a group of one or more playback devices to play audio content. In the case of the control device receiving this command, the command may be internally generated as a result of user selection on the user interface 308 of the control device or the command being received from another playback device. In the case of the battery-powered playback device receiving this command, the battery-powered playback device may receive the command to play back audio from the control device or also be an internally generated command as a result of a user selection on a user interface of the playback device. The command may indicate a group of playback devices to playback the audio content. The group may be a zone of playback devices or one or more specific playback devices that are to play back audio in synchrony.

A group coordinator may be identified based on the configuration of each playback devices in the group of playback devices.

In one example, a first playback device of one or more playback devices in the media playback system may be a group coordinator device configured to provide audio content data and audio content playback timing information to other playback devices in the group to facilitate the synchronized audio content playback. Accordingly, in some cases, establishing the group of one or more playback devices in a playback system may involve selecting or designating the first playback device as the group coordinator for the group.

In another example, the first playback device may be designated as the group coordinator device by virtue of being a playback device in a zone or group that the other playback devices are being added to. For instance, the media playback system may include a "kitchen" zone, a "dining room" zone, and a "living room" zone. In the case the kitchen zone playback devices are being grouped with, or added to the dining room zone, a playback device in the dining room zone may be designated as the group coordinator. In other words, if a second playback device from a second zone is being grouped with or added to a first zone with the first playback device, the first device may automatically be designated as the group coordinator device of the new group by virtue of was added to.

In other embodiments, the playback device which is a bridge device or specifically a root device of an STP may be designated as the group coordinator device.

In still other instances, the group coordinator may be initially determined by default based on the media playback configuration. For instance, in a stereo pair, a left speaker may be a group coordinator for the right speaker. In another instance, a center speaker of a 5.1 Dolby surround system may be the group coordinator for the surround system. In yet another instance, a group coordinator may be the playback device to which another playback device is added. For example, if a playback device in a living room is playing audio content and is grouped with a playback device in a kitchen, then the playback device in the living room is the group coordinator for the playback device in the kitchen. Other arrangements are also possible. Other arrangements are also possible.

At 604, a determination is made based on the command that a playback device is a battery-powered playback device. In the case of the control device performing this determination, the playback device may be networked to the control device. In the case of the playback device performing this determination, the playback device may be itself. The state variable stored in a playback device may indicate whether the playback device is battery-powered. As another example, a playback device may periodically send a message to other playback devices and the control device in the media playback system with its state variable. For example, a message may be sent to a playback device to request its state variable and the playback device may respond by sending the state variable to the device requesting it.

If the playback device is a battery-powered playback device, then at 606, another playback device is identified to be the group coordinator based on the determination. The group coordinator may provide audio content data and audio content playback timing information to a group of the one or more playback devices. The other playback device that is identified may be a designated playback device for the battery-powered playback device. In this regard, any time that the battery-powered playback device is identified, the designated playback back device (not a battery-powered playback device) is assigned to be the group coordinator. Alternatively, the playback device that is selected may be based on one or more criteria which is discussed in more detail with respect to FIG. 7 below.

If the battery-powered playback device, itself, identifies another playback device to be the group coordinator, then the battery-powered playback device may inform the other playback device and the control device that the other playback device is the group coordinator. For example, the battery-powered playback device may send a message to the other playback device and the control device. Alternatively, the battery-powered playback device may not inform the control device and simply relay any messages (e.g., commands relating to management of the media playback system) between the control device and the playback device which has been identified as the group coordinator. In yet another case, the identified playback device now serving as the group coordinator may inform the control device that it is the group coordinator.

Figure 7:
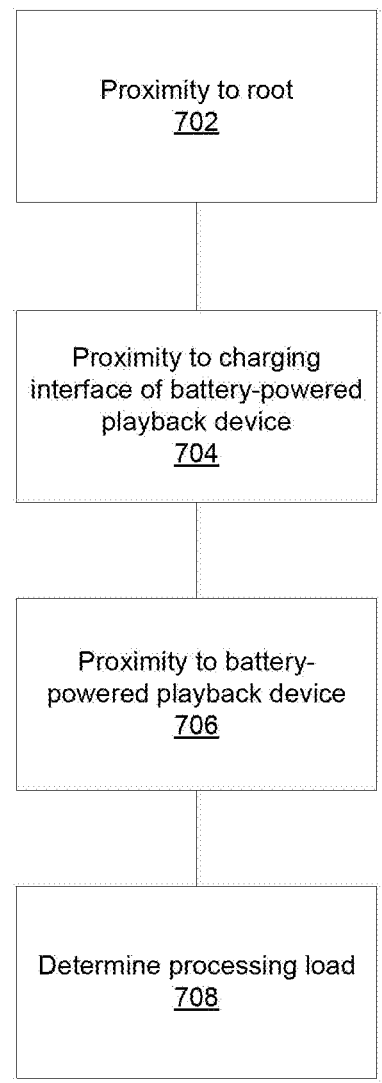
FIG. 7 illustrates example criteria for selecting a group coordinator among one or more playback devices.

FIG. 7 illustrates one or more criteria for identifying the other playback device, which is not a battery-powered playback device, as the group coordinator.

The criteria may include, at 702, a proximity to a root of the media playback system network, at 704, a proximity to a charging interface of a battery-powered playback device, at 706, a proximity to a battery-powered playback device, and at 708, a determination of processing load. These criteria may be designed to reduce power consumption of the battery-powered playback device when playing back audio content, thereby increasing the time that the playback device can operate under the battery power and also improving an overall audio playback experience of the media playback system. The battery-powered playback device may be the particular playback device which was determined to be battery-powered or some other battery-powered playback device.

The controller or playback device may determine the criteria of FIG. 7 for one or more candidate playback devices in the media playback system to be the group coordinator. Based on the criteria, an appropriate playback device may be identified as the group coordinator.

The root, charging interface, and battery-powered playback devices in the media playback system may be able to indicate location. Accordingly, the proximity from the candidate playback device to the root, charging interface, and/or a battery-powered playback device may be measured in various ways. As one example, the proximity may be determined based on network hops to a particular location based on a network map known to the playback device or the control device. The network map may define a topology of the network devices in the media playback system. As another example, the proximity may be determined based on a received signal strength (RSSI) measure or packet error rate (PER) measure. The measure may be from a playback device to the particular location. A message may be sent to a playback device to provide an RSSI or PER measure from the playback device to a particular location, e.g., root, charging interface, or battery-powered playback device, and the playback device may respond with the measure. The playback device then determines the RSSI or PER measure to the particular location and then sends a message back with the RSSI or PER measure. The device that receives the message, e.g., control device or playback device, may select the appropriate group coordinator based on the one or more proximity measures.

At 708, the processing load of a playback device may be determined. The processing load may be characterized, for example, as whether a playback device (battery-powered or non-battery-powered) is playing audio content and/or whether the playback device is already a group coordinator for another group. If a particular playback device is already playing music, then the particular playback device might not also be selected as a group coordinator. If a particular playback device is already a group coordinator for one group, then the particular playback device might not also be also selected as another group coordinator.

The group coordinator that is selected might or might not be part of the group. As one example, if the group includes one or more non-battery-powered playback devices, then the group coordinator may be one of these playback devices and also be in the same group. As another example, if the group has only battery-powered playback devices, then the non-battery-powered playback device selected as the group coordinator might not be in the same group as the battery-powered playback devices. The group coordinator might not play back audio content in synchrony with the group it coordinates. But the group coordinator could still be playing back audio content associated with another group that it does not coordinate.

FIGS. 6 and 7 illustrate an embodiment when the battery-powered playback device is not selected as a group coordinator. In some embodiments, the battery-powered playback device may be selected as a group coordinator.

Figure 8:
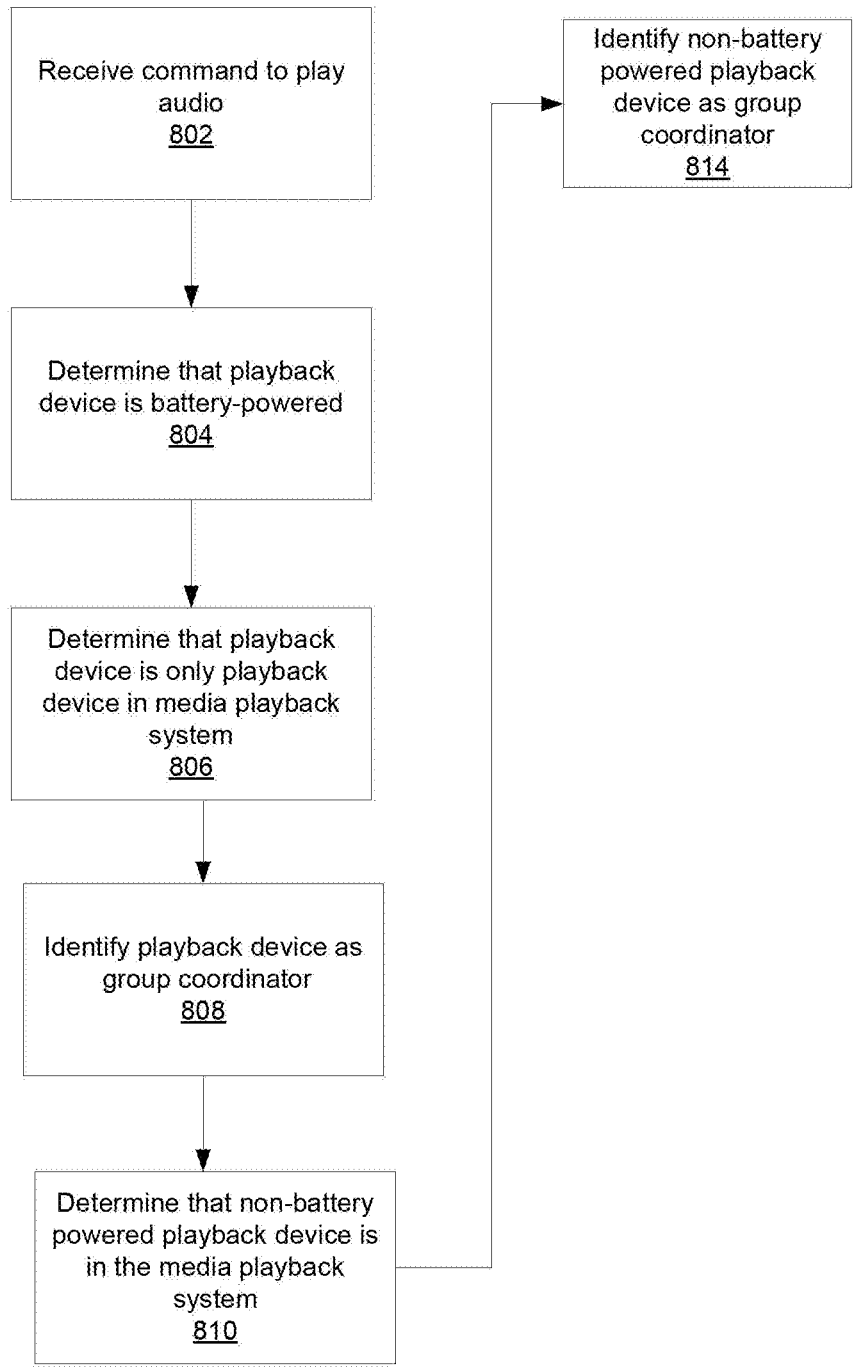
FIG. 8 is another example flow diagram for identifying a group coordinator.

FIG. 8 illustrates an example of selecting a playback device as a group coordinator when the group consists of one playback device which is a battery-powered playback device. At 802, a command is received to play back audio. The control device or a playback device may receive this command. At 804, a determination is made that the playback device is a battery-powered playback device. For example, the determination may be made based on the state variable managed by the playback device. At 806, a determination is made that the playback device is the only playback device in the media playback system or the group of playback devices. For example, the network map may indicate that the playback device is the only playback device in the media playback system and the command to play back audio may indicate that the playback device is the only playback device in the group. At 808, the battery-powered playback device may be selected as the group coordinator.

If another playback device is added to media playback system or group and the other playback device is not powered by a battery, then the other playback device which is added may be identified as the group coordinator for the battery-powered playback device. This situation may arise, for example, if a kitchen zone is joined with a living room zone for playback of audio content, when the living room zone had only a battery-powered playback device and the kitchen zone has a playback device not powered by a battery.

In this regard, at 810, a determination may be made that a non-battery-powered device is in the media playback system. For example, the group coordinator may send a message to a playback device added to the media playback system. Then, the playback device may respond with its state variable. The state variable may indicate that the playback device is not powered by a battery. At 812, the non-battery-powered playback device is identified as the group coordinator. In this embodiment, the battery-powered playback device is identified as a group coordinator until a non-battery-powered playback device is available to serve as the group coordinator. The non-battery-powered playback device may be made group coordinator by default or based on one or more criteria similar to that in FIG. 7.

Figure 9:
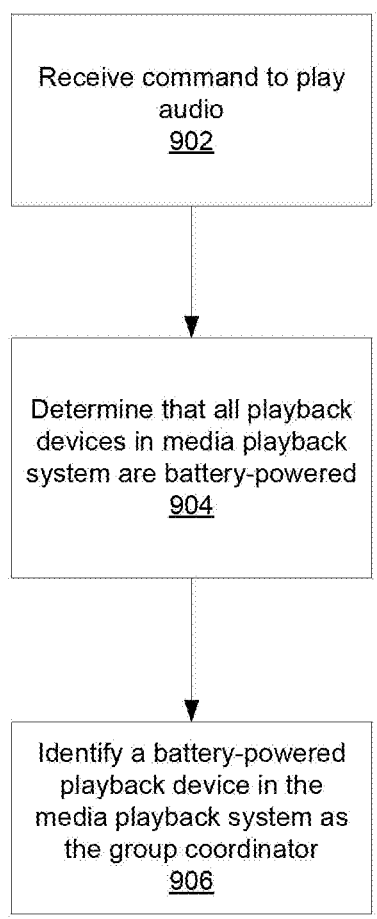
FIG. 9 is yet another example flow diagram for identifying a group coordinator

FIG. 9 illustrates an embodiment for identifying a group coordinator when all of the playback devices in the media playback system are battery-powered playback devices. If all of the playback devices in the media playback system are battery-powered playback devices, then one of the battery-powered playback may be identified as the group coordinator.

At 902, a command to play back audio is received by a control device or playback device. At 904, a determination is made that all playback devices in the media playback system are battery-powered playback devices. The state variable may indicate whether the playback device are battery-powered playback devices. For example, a message may be sent to each playback device requesting the state variables for each of the playback devices in the media playback system, and a determination is made from the received state variable that all are battery-powered playback devices. As another example, each playback device may periodically send to the other playback devices its state variable to make this determination. As yet another example, the playback device may already have stored the state variable indicating whether the playback device is battery-powered or not. At 906, a battery-powered playback device in the media playback system may be identified as the group coordinator.

Figure 10:
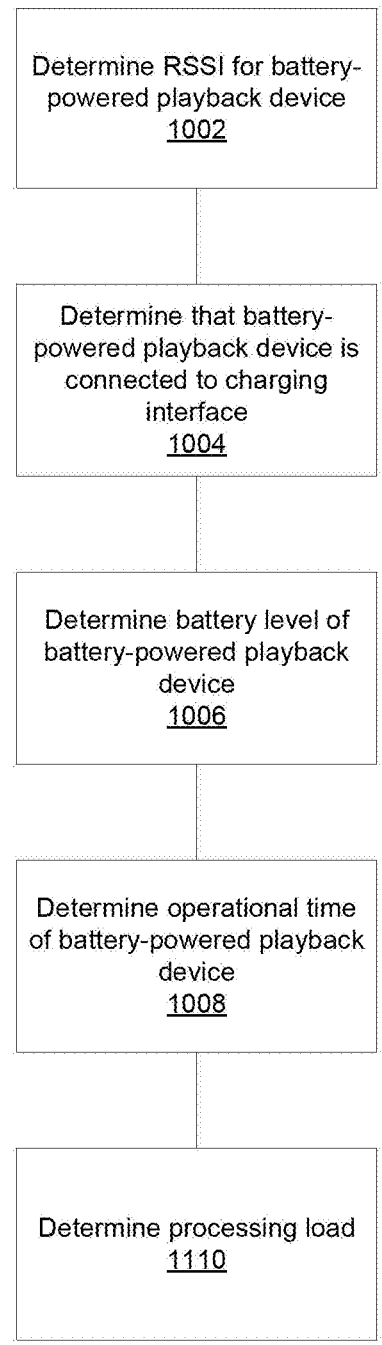
FIG. 10 illustrates example criteria for selecting a group coordinator among one or more playback devices.

FIG. 10 illustrates the identification of the specific battery-powered playback device in the embodiment of FIG. 9. This identification may be based on one or more criteria. The criteria may be analyzed for one or more playback devices in the media playback system to identify the particular battery-powered playback device to be the group coordinator. The criteria may include, at 1002, an RSSI measure (or PER) from a battery-powered playback device to the root of the media playback system network, at 1004, whether the battery-powered playback device is connected to a charging interface for charging, at 1006, a battery level of the battery for the battery-powered playback device. The RSSI measure, PER measure, or battery level may be compared to threshold amounts to determine whether the associated criteria is acceptable.

At 1008, the criteria may also include an operational time of the battery-powered playback device. A battery-powered playback device may play audio for a period of time. If this period of time is less than a threshold amount, then the battery-powered playback device may be identified as a group coordinator. Otherwise, the battery-powered playback device may not be identified as the group coordinator. The threshold amount may vary based on operational parameters of the playback device including volume and other factors. For instance, high volume playback may result in a lower threshold because the battery-powered playback device may consume more power during playback and as a result may not be operational in a battery-powered mode for as long. The playback device may maintain and provide this information as part of its state variable which is provided to the network devices periodically or as part of a request.

At 1110, a processing load of a particular playback device may be determined. The processing load may be characterized, for example, as whether a playback device (battery-powered or non-battery-powered) is playing audio and/or whether the playback device is already a group coordinator for another group. If a particular playback device is already playing audio, then the particular playback device may not also be selected as a group coordinator. If a particular playback device is already a group coordinator for one group, then the particular playback device may not also be selected as another group coordinator.

Figure 11:
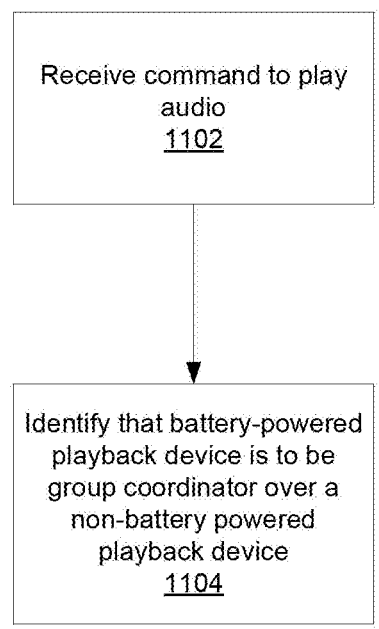
FIG. 11 is an example flow diagram for identifying a group coordinator.

In some embodiments, a battery-powered playback device may be selected over a non-battery-powered playback device when the media playback system includes both types of playback devices. FIG. 11 illustrates this embodiment where the media playback system includes both battery-powered playback devices and non-battery-powered playback devices. In this embodiment, a battery-powered playback device may be identified as a group coordinator over a non-battery-powered playback device. At 1102, a playback device or control device may receive a command to play audio. At 1104, a battery-powered playback device is identified to be a group coordinator over a non-battery-powered playback device.

Figure 12:
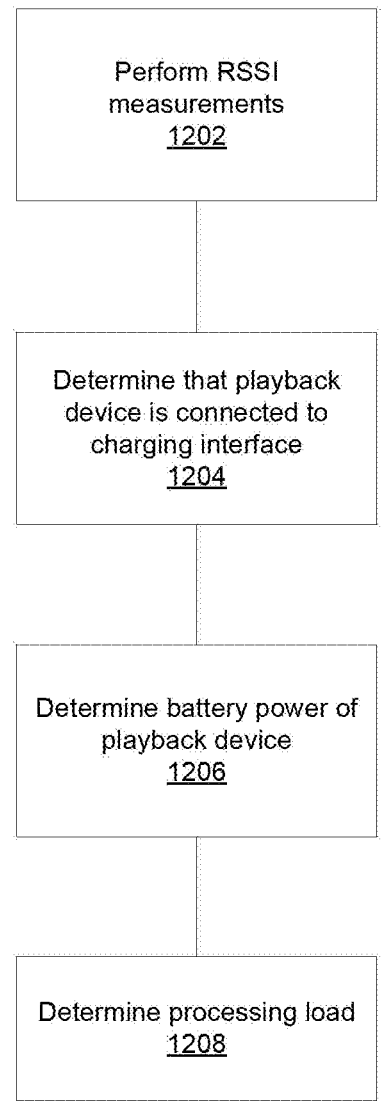
FIG. 12 illustrates example criteria for selecting a group coordinator among one or more playback devices.

FIG. 12 illustrates in more detail one or more criteria for identifying the playback device to be the group coordinator in this scenario. The criteria may be analyzed for one or more playback devices to identify the playback device to serve as the group coordinator.

At 1202, the criteria may involve determining RSSI and/or PER measurements from a battery-powered playback device to the root and an RSSI and/or PER from a playback device not powered by the battery to the root. As one example, if the RSSI for the battery-powered playback device to the root is above a threshold, then the battery-powered playback device may be identified as a group coordinator. As another example, if the RSSI for the battery-powered playback device to the root is greater than the RSSI measure for the playback device not powered by the battery to the root, then the battery-powered playback device may be identified as a group coordinator over the non-battery-powered playback device. As yet another example, if the RSSI measure for the playback device not powered by the battery is less than a threshold, then the battery-powered playback device may be identified as a group coordinator over the non-battery-powered playback device.

The criteria may also include, at 1204, the battery-powered playback device being connected to the charging interface and being charged. At 1206, the criteria may include determining a battery power of the battery-powered playback device. For instance, the battery-powered playback device may be identified as the group coordinator if the battery power is above a threshold amount. At 1208, the criteria may include determining a processing load of a playback device. One or more of the criteria shown in FIG. 12 may be evaluated in making the determination that a battery-powered playback device is to be the group coordinator over a non-battery-powered playback device.

Figure 13:
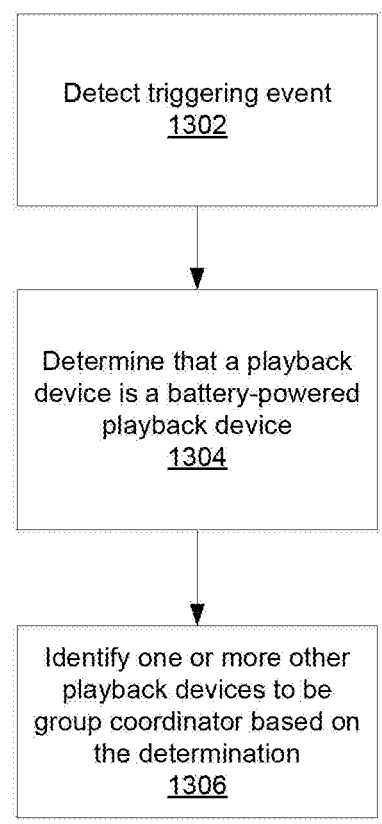
FIG. 13 is an example flow diagram for identifying a plurality of possible group coordinators.

In some embodiments, a network device, such as the playback device, bridge device, or control device, may generate, maintain, and update a list of possible group coordinators from which to select a group coordinator. FIG. 13 is an example flow diagram for identifying the group coordinator in accordance with this embodiment.

At 1302, a network device may detect a triggering event. One example of a triggering event may be that the network device receives a command to play audio. Other examples may include the network device powering up, joining a media playback system, or joining a group of playback devices. In yet another example, the network device may receive a signal. The signal may be periodically generated by the network device or another network device in the media playback system.

At 1304, the network device may determine whether any of the playback devices in the media playback system is a battery-powered playback device. The network device may make this determination in accordance with the methods discussed above, including using a state variable maintained by the playback device or a state variable received from another playback device or the control device.

In embodiments, the battery-powered playback device might not be designated as a group coordinator. In this regard, at 1306, the network device may identify one or more other devices to be group coordinator based on the determination. The identification of the one or more other group coordinators may include, but is not limited to, applying one or more of the criteria identified in FIGS. 7, 10, and 12, for example. The network device may generate a list of devices that may serve as group coordinator and this list may be further ranked to identify those candidates that might be better than other candidates as group coordinator for respective playback devices. Generally, the group coordinator could be a playback device (battery-powered or non-battery powered) or a bridge device. Then, each time the network device, e.g., battery-powered playback device, non-battery-powered playback device, bridge device, or control device, needs to identify a group coordinator, the network device may simply refer to this list rather than having to apply the identification criteria each time to identify the appropriate group coordinator. Further, this list may be updated based on one or more of the triggering events at 1302 so that the network device has the proper identification of playback devices that may serve as group coordinator.

The network device may share this list with other network devices. Whether the list is shared may depend on the criteria applied. If the criteria applied to determine the group coordinator is location dependent, such as some of the RSSI measurements 1202, the list of possible group coordinators for one network device might not be applicable to another network device. In this regard, each network device, e.g., playback device, control device, bridge device, may performs steps 1302 to 1306, itself, to determine its own list of group coordinators. On the other hand, if the criteria applied is not location dependent, such as some of the proximity measures 704-708, then the list of possible group coordinators for one network device may be applicable to another network device. In this regard, the criteria used may permit sharing of the list of group coordinators between network devices.

In some embodiments, the battery-powered playback device may serve as an access point in the media playback system but not a bridge. The access point may serve to receive and transmit messages (e.g., commands associated with management of the media playback system) between network devices whereas the bridge may serve to receive and transmit audio content, e.g., to one or more playback devices (which is more data intensive). A battery-powered playback device may be suited for access point functionality, but not bridge functionality. Alternatively, a non battery-powered playback device may be suited for bridge functionality but not access point functionality. Other arrangements are also possible.

Further, even though one playback device is initially selected as a group coordinator, that selection may change depending on the configuration of that playback device and the media playback system over time. For instance, if the battery level of the battery-powered playback device which is the group coordinator falls below a threshold amount, then the battery-powered playback device may identify another playback device to be a group coordinator instead of itself in accordance with one of the embodiments discussed above. In this regard, the selection of the group coordinator is not a one-time event but continues based on the configuration of the group coordinator and the media playback system.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A first playback device comprising:
   at least one battery;
   at least one processor;
   a non-transitory computer-readable medium; and
   program instructions stored on the non-transitory computer-readable medium that are executable by the at least one processor such that the first playback device is configured to:
   receive an instruction to operate as a group coordinator of a synchrony group, wherein the synchrony group comprises the first playback device and one or more other members, and wherein the group coordinator of the synchrony group is responsible for (i) receiving a playback command for the synchrony group, (ii) after receiving the playback command, transmitting audio content and playback timing information to the one or more other members of the synchrony group, and (iii) engaging in synchronous playback of the audio content with the one or more other members of the synchrony group using the playback timing information;
   determine a value of a battery state variable of the at least one battery;
   based on the value of the battery state variable of the at least one battery, select a second playback device from the one or more other members of the synchrony group to operate as the group coordinator of the synchrony group; and
   transition the group coordinator from the first playback device to the second playback device while maintaining synchronous playback of the audio content in the synchrony group such that the second playback device to operates as the group coordinator of the synchrony group.

2. The first playback device of claim 1, wherein the program instructions that are executable by the at least one processor such that the first playback device is configured to determine the value of the battery state variable of the at least one battery comprise program instructions that are executable by the at least one processor such that the first playback device is configured to determine a battery level is below a threshold level.

3. The first playback device of claim 1 further comprising a charging interface, wherein the program instructions that are executable by the at least one processor such that the first playback device is configured to determine the value of the battery state variable of the at least one battery comprise program instructions that are executable by the at least one processor such that the first playback device is configured to determine whether an external power source is decoupled from the charging interface.

4. The first playback device of claim 1, wherein the program instructions that are executable by the at least one processor such that the first playback device is configured to select the second playback device comprise program instructions that are executable by the at least one processor such that the first playback device is configured to determine that the second playback device is coupled to an external power source.

5. The first playback device of claim 1, wherein the program instructions that are executable by the at least one processor such that the first playback device is configured to select the second playback device comprise program instructions that are executable by the at least one processor such that the first playback device is configured to determine that the second playback device has a battery level above a threshold level.

6. The first playback device of claim 1, wherein the program instructions that are executable by the at least one processor such that the first playback device is configured to select the second playback device comprise program instructions that are executable by the at least one processor such that the first playback device is configured to determine that the second playback device has a processing load above a threshold level.

7. The first playback device of claim 1, wherein the program instructions that are executable by the at least one processor such that the first playback device is configured to select the second playback device from the one or more other members of the synchrony group to operate as the group coordinator are also based on the instruction to operate as the group coordinator.

8. The first playback device of claim 1, wherein the program instructions that are executable by the at least one processor such that the first playback device is configured to transition the group coordinator from the first playback device to the second playback device comprise program instructions that are executable by the at least one processor such that the first playback device is configured to transmit an instruction to the second playback device to operate as the group coordinator.

9. The first playback device of claim 1, further comprising program instructions that are executable by the at least one processor such that the first playback device is configured to:
transmit an indication that the first playback device is not operating as the group coordinator of the synchrony group.

10. A non-transitory computer-readable medium, wherein the non-transitory computer-readable medium is provisioned with program instructions that are executable by at least one processor such that a first playback device is configured to:
receive an instruction to operate as a group coordinator of a synchrony group, wherein the synchrony group comprises the first playback device and one or more other members, and wherein the group coordinator of the synchrony group is responsible for (i) receiving a playback command for the synchrony group, (ii) after receiving the playback command, transmitting audio content and playback timing information to the one or more other members of the synchrony group, and (iii) engaging in synchronous playback of the audio content with the one or more other members of the synchrony group using the playback timing information;
determine a value of a battery state variable of at least one battery of the first playback device;
based on the value of the battery state variable of the at least one battery, select a second playback device from the one or more other members of the synchrony group to operate as the group coordinator of the synchrony group; and
transition the group coordinator from the first playback device to the second playback device while maintaining synchronous playback of the audio content in the synchrony group such that the second playback device to operates as the group coordinator of the synchrony group.

11. The non-transitory computer-readable medium of claim 10, wherein the program instructions that are executable by the at least one processor such that the first playback device is configured to determine the value of the battery state variable of the at least one battery comprise program instructions that are executable by the at least one processor such that the first playback device is configured to determine a battery level is below a threshold level.

12. The non-transitory computer-readable medium of claim 10, wherein the program instructions that are executable by the at least one processor such that the first playback device is configured to determine the value of the battery state variable of the at least one battery comprise program instructions that are executable by the at least one processor such that the first playback device is configured to determine whether an external power source is decoupled from a charging interface of the first playback device.

13. The non-transitory computer-readable medium of claim 10, wherein the program instructions that are executable by the at least one processor such that the first playback device is configured to transition the group coordinator from the first playback device to the second playback device comprise program instructions that are executable by the at least one processor such that the first playback device is configured to transmit an instruction to the second playback device to operate as the group coordinator.

14. A method comprising:
receiving, by a first playback device, an instruction to operate as a group coordinator of a synchrony group, wherein the synchrony group comprises the first playback device and one or more other members, and wherein the group coordinator of the synchrony group is responsible for (i) receiving a playback command for the synchrony group, (ii) after receiving the playback command, transmitting audio content and playback timing information to the one or more other members of the synchrony group, and (iii) engaging in synchronous playback of the audio content with the one or more other members of the synchrony group using the playback timing information;
determining, by the first playback device, a value of a battery state variable of at least one battery of the first playback device;
based on the value of the battery state variable of the at least one battery, selecting, by the first playback device, a second playback device from the one or more other members of the synchrony group to operate as the group coordinator of the synchrony group; and
transitioning, by the first playback device, the group coordinator from the first playback device to the second playback device while maintaining synchronous playback of the audio content in the synchrony group such that the second playback device to operates as the group coordinator of the synchrony group.

15. The method of claim 14, wherein determining, by the first playback device, the value of the battery state variable of the at least one battery comprises determining, by the first playback device, a battery level is below a threshold level.

16. The method of claim 14, wherein determining, by the first playback device, the value of the battery state variable of the at least one battery comprises determining, by the first playback device, whether an external power source is decoupled from a charging interface of the first playback device.

17. The method of claim 14, wherein selecting, by the first playback device, the second playback device comprises determining, by the first playback device, that the second playback device is coupled to an external power source.

18. The method of claim 14, wherein transitioning, by the first playback device, the group coordinator from the first playback device to the second playback device comprises transmitting, by the first playback device, an instruction to the second playback device to operate as the group coordinator.

19. The method of claim 14, further comprising transmitting, by the first playback device, an indication that the first playback device is not operating as the group coordinator of the synchrony group.

\* \* \* \* \*